(12) United States Patent
Smith

(10) Patent No.: US 6,842,948 B2
(45) Date of Patent: Jan. 18, 2005

(54) RUBBER BAND RETAINER APPARATUS

(75) Inventor: Kennith Smith, Portland, TN (US)

(73) Assignee: Alliance Rubber Company, Hot Springs, AR (US)

(*) Notice: Subject to any disclaimer, the term of this patent is extended or adjusted under 35 U.S.C. 154(b) by 0 days.

(21) Appl. No.: 10/749,430

(22) Filed: Dec. 31, 2003

(65) Prior Publication Data
US 2004/0154138 A1 Aug. 12, 2004

Related U.S. Application Data

(63) Continuation of application No. 09/943,533, filed on Aug. 30, 2001, now abandoned.

(51) Int. Cl.[7] .................... B65D 63/00; F16L 33/00
(52) U.S. Cl. ............ 24/16 R; 24/30.5 R; 24/265 EC; 24/300
(58) Field of Search ............... 24/265 EC, 265 CD, 24/265 C, 300, 265 AL, 302, 16 R, 30.5 R, 130

(56) References Cited

U.S. PATENT DOCUMENTS

| | | | |
|---|---|---|---|
| 3,721,750 A | * 3/1973 | Countryman | 24/16 R |
| 4,158,250 A | 6/1979 | Ringwald | 24/16 |
| 4,237,174 A | * 12/1980 | Lagardere et al. | 24/265 BC |
| 4,335,490 A | 6/1982 | Teachout | 24/114.5 |
| 4,406,042 A | 9/1983 | McPhee | 24/129 A |
| 4,428,099 A | 1/1984 | Richmond | 24/68 |
| 4,569,108 A | 2/1986 | Schwab | 24/17 |
| 4,689,858 A | * 9/1987 | Barber | 24/265 BC |
| 4,762,318 A | 8/1988 | Phillips et al. | 272/137 |
| 4,910,835 A | 3/1990 | Carpenter | 24/129 |
| 4,991,265 A | 2/1991 | Campbell et al. | 24/16 |
| 5,081,746 A | 1/1992 | Czwartacki | 24/17 |
| 5,123,913 A | 6/1992 | Wilk et al. | 24/16 PB |
| 5,195,218 A | 3/1993 | Joseph et al. | 24/129 D |
| 5,199,135 A | 4/1993 | Gold | 24/16 |
| 5,232,193 A | 8/1993 | Skakoon | 24/130 |
| 5,325,568 A | 7/1994 | Bruhm | 24/301 |
| 5,524,327 A | 6/1996 | Mickel et al. | 24/115 A |
| 5,531,418 A | 7/1996 | Lindgran | 135/120.4 |
| 5,592,718 A | 1/1997 | Mohr | 24/265 |
| 5,715,578 A | 2/1998 | Knudson | 24/16 |
| 5,852,851 A | 12/1998 | Cooper | 24/30.5 R |
| 5,987,707 A | 11/1999 | DeShon | 24/129 A |
| 5,996,204 A | 12/1999 | Norwood | 24/129 B |
| 6,195,846 B1 | 3/2001 | Studdiford et al. | 24/16 R |
| 6,226,839 B1 | 5/2001 | Sayegh | 24/16 PB |
| 6,543,094 B2 | * 4/2003 | D'Addario | 24/16 R |

* cited by examiner

*Primary Examiner*—Robert J. Sandy
(74) *Attorney, Agent, or Firm*—Renner, Kenner, Greive, Bobak, Taylor & Weber

(57) ABSTRACT

A wrap for securing objects having an elastomeric band, a retainer having a body defining a notch for receiving widthwise a portion of the elastomeric band, a band receiving portion of the notch, a first tab extending axially over the band receiving portion of the notch and defining a mouth portion of the notch, wherein the mouth portion has a width less than the width of the elastomeric band.

19 Claims, 2 Drawing Sheets

RUBBER BAND RETAINER APPARATUS

This application is a continuation of U.S. Ser. No. 09/943,533 filed on Aug. 30, 2001, now abandoned.

TECHNICAL FIELD

The present invention generally relates to a rubber band retaining apparatus. More specifically, the invention relates to a rubber band retainer which selectively joins end loops in a rubber band positioned about one or more objects. More particularly, the present invention relates to a rubber band retainer which attaches to an end loop of a rubber band for insertion through a second end loop of the rubber band when wrapped around one or more objects.

BACKGROUND OF THE INVENTION

Elastomeric bands have long been employed to bundle or otherwise organize one or more objects. Typically, these bands are used to organize objects such as: computer cables and cords, telephone system cords, power tool cords, building materials, automotive parts, jumper cables, gardening stakes, plants, appliance cords, extension cords, decorative lights, skies and poles, fishing equipment, boating lines, camping equipment and sleeping bags. The most common use of such bands is to stretch the band over a plurality of items to hold them together or double-up the band, when the length of the elastomeric band prevents it from holding items snugly together. In this instance the objects pass through the loop or loops defined by the band.

An alternative use of elastomeric bands is to create a loop, when organizing objects, by securing the ends of the band together. Since the ends of the band cannot be readily attached or secured to each other, it is known to employ a dowel pin or "handle" to join the ends of the band. In this process the dowel is typically used to prevent the ends of the elastomeric band from coming apart. The combination of the elastomeric band and dowel incorporating this type of attachment are often referred to as binding devices or binder ties.

In one such binding device, the elastomeric band is wrapped around a bundle such that the ends are brought into an opposing relation with each other. Then, a first end of the loop is passed through a second end of the loop. The band may be pulled tight against the bundle by pulling the first end back against itself. The dowel pin is then inserted through the first loop, which is free, to prevent the first loop from withdrawing through the second loop. To function properly, the bands are generally sized and/or wrapped in such a way that the dowel is held in tension. In this way, the axial length of the dowel, which is generally longer than any opening created by the second end of the band, when the band is in tension, bears against the elastomeric band, preventing the dowel and thus the first loop from withdrawing through the second loop.

In one such device, the dowel was provided with a tapered end to facilitate insertion of the dowel in the end of the band allowing the band to be stretched onto a generally cylindrical portion of the dowel. This portion of the dowel, however, was smooth and offered no axial restraint to keep the band on the dowel. In some instances, the band would roll, slide or otherwise move axially to a point where the end of the band came free of the dowel. To prevent this disengagement, another design, functioning in the same way, incorporated a circumferential open notch formed centrally of the dowel to restrict axial movement of the band. In this design, the first end is threaded through the second end, as in the previous design, but, when the dowel is inserted, the first end of the band is placed within the notch such that the walls of the notch tend to prevent the end of the band from sliding off of the dowel. While these designs are successful in organizing a bundle, they are somewhat inefficient in that the process of bundling requires several steps, namely, encircling the bundle, passing one end of the band through the other, and inserting the dowel. Further, the end of the band may slide off the dowel when the bundle is subject to distortion during movement or handling.

Recognizing these deficiencies, efforts have been made to affix a handle to the elastomeric band, such that when wrapping the elastomeric band around a bundle, the free end of the band is simply stretched over the handle end. To affix the handle to the loop, one design incorporated an axial slot extending through the handle. One end of the elastomeric band is threaded through the slot, such that a looped portion of the end extends beyond the handle. A pin having a greater axial extent than that of the slot is then inserted through the extending loop to preclude the extending loop from returning through the slot. Recessed notches were formed adjacent either end of the slot for receiving the ends of the pin, thereby allowing the pin to be recessed within the body of the handle. The elastomeric band was then pulled tight against the pin to hold the pin within the recessed notches. This design relied on the force of the band against the pin to hold the pin within the recess. In most uses, the band is suitably tensioned to hold the pin fast, but, in some instances, the pin may fall out allowing the band to withdraw from the notch in the handle. At this point, the band is no longer secured to itself and fails to hold the bundle. Also, when not in use, the pin may fall out because the band is slack with no force being applied to hold the pin in the notches. Since the pin used to secure the dowel to the end of the elastomeric band is typically small, when it comes free of the handle, it is easily lost. If the pin is lost, the handle cannot be used to couple the ends of the loop. At this point, the user must endeavor to obtain a substitute pin or purchase additional binder ties.

SUMMARY OF THE INVENTION

Therefore, an object of the present invention is to provide rubber band retainer apparatus which may be selectively attached to a rubber band for securing the ends of the rubber band when wrapped around one or more objects. Another object of the present invention is to provide such retainer apparatus which may be configured for ease of attachment to and removal from a rubber band while remaining firmly attached to the rubber band when operatively positioned thereon. A further object of the invention is to provide such retainer apparatus which may be configured to maintain a selected position on a rubber band when mounted thereon.

A still further object of the invention is to provide such retainer apparatus which is a one-piece configuration without separable parts which can be lost or misplaced or accidentally separated during utilization. Yet another object of the invention is to provide such a retainer which can be readily molded of plastic material, which is durable and can be repeatedly reused and which is relatively inexpensive.

The present invention provides a wrap for securing objects having an elastomeric band, a retainer having a body defining a notch for receiving widthwise a portion of the elastomeric band, a band receiving portion of the notch, a first tab extending axially over the band receiving portion of the notch and defining a mouth portion of the notch, wherein the mouth portion has a width less than the width of the elastomeric band.

DETAILED DESCRIPTION OF THE INVENTION

Figure 1:
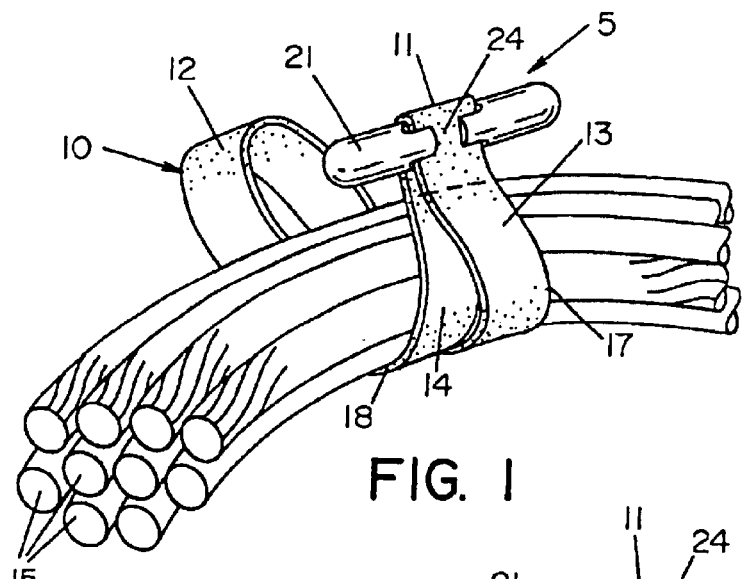
FIG. 1 is a perspective view of a wrap having a retainer according to the present invention depicting the retainer affixed to a first end of an elastomeric band and having a second end opposite the first end, where the band is shown in an unsecured position partially wrapped about a fragmentary portion of a plurality of cylindrical objects.

A rubber band retainer according to the concepts of the present invention is depicted in the Figures where it is generally referred to by the numeral 5. In FIG. 1, retainer 5 is shown attached to an elastomeric band, generally indicated by the numeral 10, having a first end 11 and a second end 12 and first and second sides 13, 14 extending between the first and second end 11, 12 forming a continuous band of material. Elastomeric bands of this configuration are commonly made of a variety of elastomeric compounds in a wide variety of different sizes.

Figure 2:
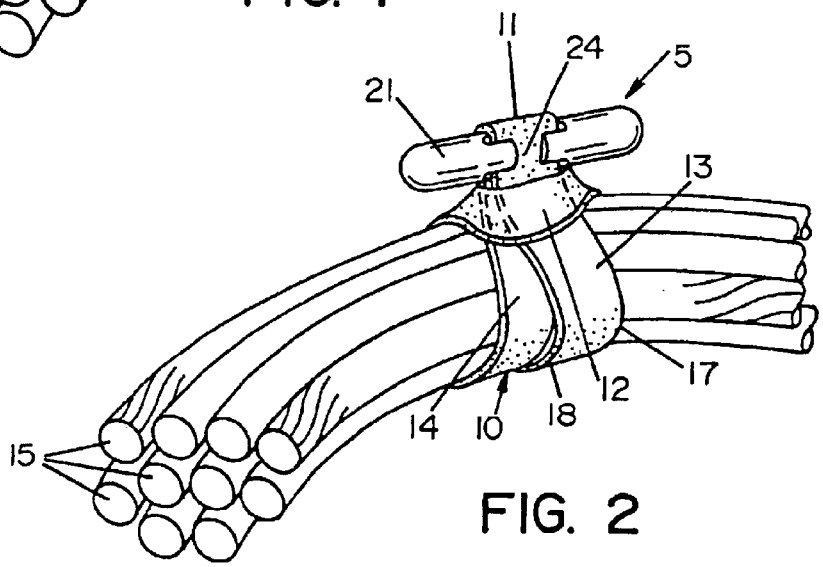
FIG. 2 is a perspective view similar to FIG. 1, depicting the wrap where the retainer and elastomeric band have been placed in a secured position with the retainer and first end passed through the second end of the elastomeric band and oriented to prevent the retainer from withdrawing through the second end.
Figure 3:
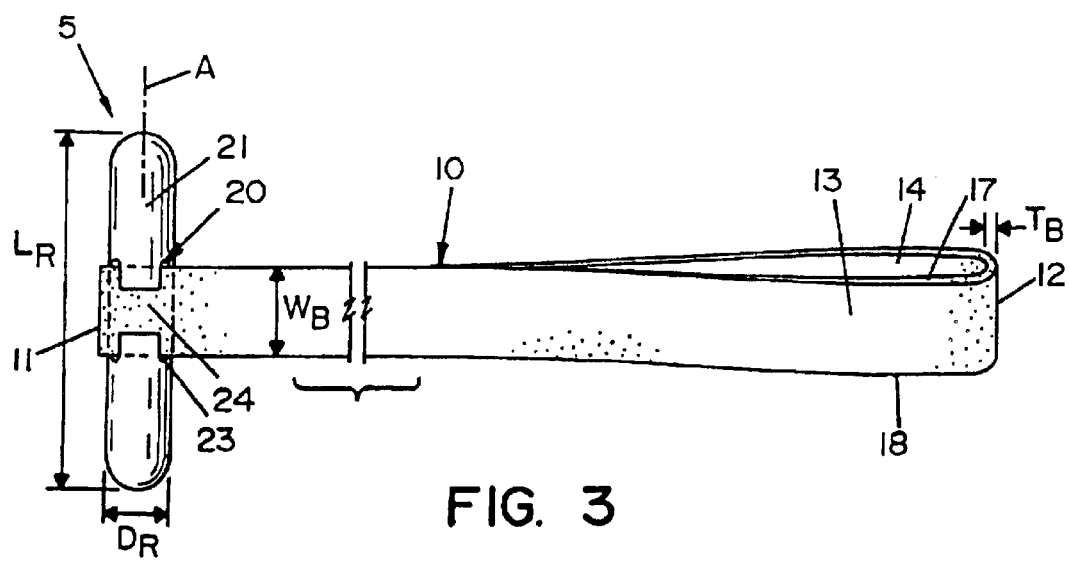
FIG. 3 is a top elevational view of a retainer according to the present invention affixed to an elastomeric band by a retaining notch having opposed tabs securing the sides of the elastomeric band.
Figure 7A:
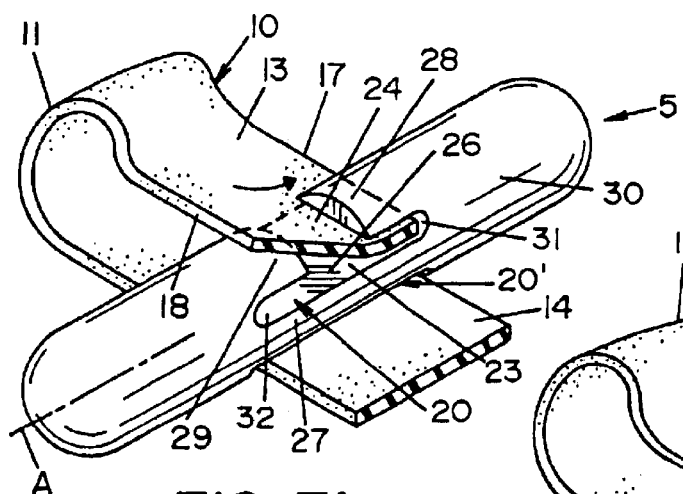
FIG. 7A is a perspective view of a retainer according to the present invention with a partially sectioned and fragmented band depicting insertion of a first edge of the elastomeric band into a notch formed in the retainer through a mouth portion of the notch into one side of a band receiving portion of the notch.
Figure 7B:
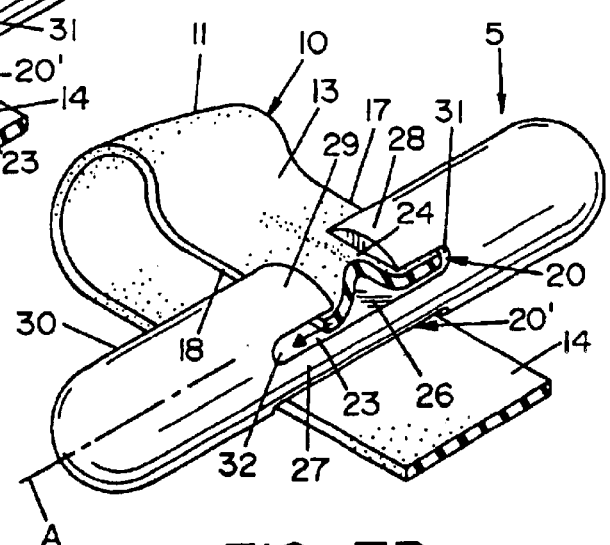
FIG. 7B is a perspective view similar to FIG. 7A depicting insertion of a second edge of the elastomeric band into the notch, where the second edge has been pinched toward the first edge to allow insertion of the second edge through the mouth portion of the notch and into the second side of the band receiving portion of the notch.

As shown in FIG. 1, retainer 5 may be attached to one end, in this case first end 11 of band 10. As depicted in FIGS. 7A and 7B, the retainer 5 is attached to band 10 by inserting first and second edges 17, 18 of band 10 sequentially or simultaneously into a retaining notch 20 formed in retainer 5. The free end of band 10, in this case second end 12, may be wrapped around one or more objects 15, such as the several cylindrical strands of material shown for exemplary purposes in FIGS. 1 and 2, to organize or secure objects 15. The band 10 is coupled end-to-end by inserting retainer 5 carrying first end 11, in button-hole or other fashion, through second end 12 to attain a secured position (FIG. 2). To prevent withdrawal of the first end 11 from second end 12, the retainer 5 maybe of any suitable dimensions, paying due attention to the size of the band 10 and the retainer's ability to resist bending forces imparted by the band 10. Referring to FIG. 3, representative retainer 5, used with a band 10 having a width $W_B$ ranging from about 0.375 to about 0.625 inches, might have a length $L_R$ of about 1.3 inches to about 2.2 inches and a diameter thickness $D_R$ of about 0.25 inches to about 0.375 inches. It will be appreciated, however, that these dimensions may be varied to accommodate a band 10 of any width $W_B$. While retainer 5 is shown as a cylindrical member, it will be appreciated that other cross-sectional configurations could be employed.

Figure 5:
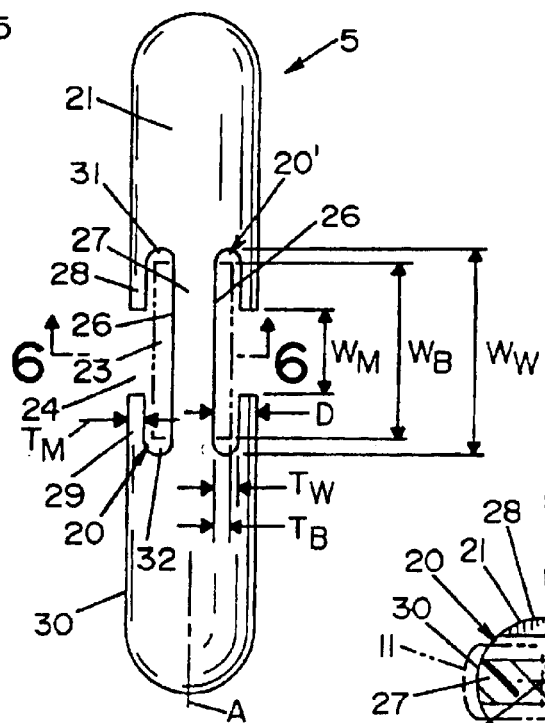
FIG. 5 is a side elevational view of a retainer similar to the retainer depicted in FIG. 3 where the retainer has opposed first and second retaining notches capable of receiving either or both sides of an elastomeric band, which is shown in phantom lines.

To attach retainer 5 to the band 10, retainer 5 generally includes at least one notch, generally indicated by the numeral 20, formed in a body portion 21. As best shown in FIG. 5, the notch 20 generally includes a band receiving portion 23, which may be in the form of a slot lying substantially parallel to the axis A of body portion 21, and a mouth portion 24. The band receiving portion 23 is generally formed such that one or more sides 13, 14 of the elastic band 10 may rest within the notch 20 in a substantially relaxed position. To prevent the retainer 5 from easily sliding axially along band 10, the width $W_W$ of band receiving portion 23 may be made very close to the width $W_B$ of the elastic band 10. For example, to accommodate bands having a width $W_B$ of about 0.375 inches to about 0.625 inches retainer 5 may have a notch 20 having a band receiving portion 23 having a width $W_W$ of about 0.35 inches to about 0.625 inches and a thickness $T_W$ of about 0.045 inches to about 0.075 inches with a mouth 24 having a width $W_M$ of about 0.125 inches to about 0.25 inches and mouth thickness $T_M$ of about 0.035 inches to about 0.05 inches. When two notches 20, 20' are present, as seen in FIG. 5, each respective base 26 of a notch 20 may be located at a distance D of about 0.08 inches to about 0.125 inches from the outer surface 30 of retainer 10 leaving a strip of material 27 between notches 20, 20' sufficient to resist bending forces applied by the elastomeric band 10 during the use of the retainer 5 without failure.

Figure 4:
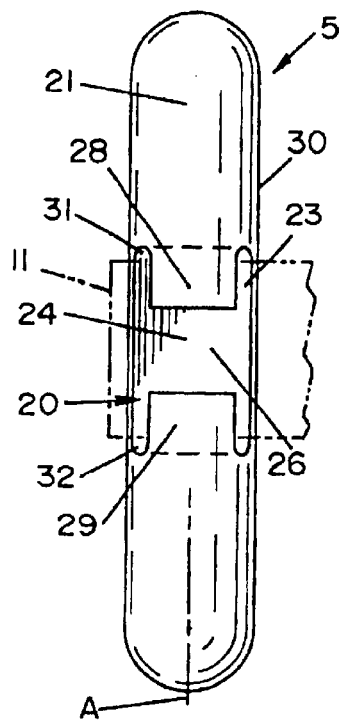
FIG. 4 is an enlarged top elevational view similar to FIG. 3 with the elastomeric band shown in phantom lines and depicting the retaining notch in greater detail.

In the embodiment shown, a tab portion 28 extends axially inward from body portion 21 to partially cover band receiving portion 23 and define the mouth 24 through which the band 10 is inserted. A single tab 28 may be used to form a substantially L-shaped notch 20 (not shown). To better secure the band the single tab 28 may extend over a majority of the width $W_W$ of band receiving portion 23. Preferably, as best seen in FIGS. 4 and 5, a second tab 29 may extend axially inward opposite first tab 28 with mouth 24 located therebetween defining a substantially T-shaped notch 20. Tabs 28, 29 may extend such that the mouth 24 is centered between the tabs 28, 29 or off-set to one side or the other. By partially covering band receiving portion 23, tabs 28, 29 limit the elastomeric band's ability to move radially relative to the band receiving portion 23, when fully inserted. When the notch 20 of retainer 5 is formed with a single tab 28, the elastomeric band 10 would be inserted through the mouth portion 24 and beneath the tab 28 within the band receiving portion 23.

In a retainer 5 having two tabs 28, 29 the elastomeric band 10 may be sequentially or simultaneously inserted beneath the tabs 28, 29 into a first side 31 and a second side 32 of band receiving portion 23. In the former type of insertion, the first edge 17 of a side 13 or 14 is passed through the mouth portion 24 and into the first side of band receiving portion 23. Then, the elastomeric band 10 is laterally compressed to allow insertion of the second edge 18 through mouth portion 24 into the second side 32 of band receiver portion 23. In the latter instance, with a suitably wide mouth portion 24 the edges 17, 18 may be simultaneously inserted.

As best shown in FIG. 5, a second notch 20' may be formed opposite the first notch 20, such that each side of the band 10 may be received within a respective notch 20, 20' on either side of the retainer 5. The second notch 20' may be constructed identical to first notch 20, and thus, its characteristics need not be described. As will be appreciated, although notches 20, 20' are shown as symmetrical in shape and placement, the notches 20, 20' do not have to be so formed.

Figure 6:
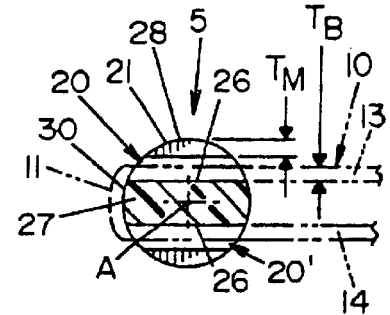
FIG. 6 is a sectional view of the retainer, taken substantially along line 6—6 of FIG. 5, with the retainer attached to an end of an elastomeric band, shown in phantom lines, depicting passage of each side of the first end of an elastomeric band through opposed retaining notches formed in the retainer.

To insert the band 10 within the notch 20, first edge 18 of side 13 may be inserted at an angle through mouth 24, as depicted in FIG. 7A. Then, as depicted in FIG. 7B, the second edge 18 of band 10 may be squeezed inwardly such that it too may pass through mouth 24. Once the second edge 18 enters band receiving portion 23, the squeezed band 10 may relax causing the second edge 18 to expand outwardly until the band 10 resumes a substantially relaxed or resting position, where the band 10 is generally flat. When using second notch 20', the procedure is repeated for the second side 14 of the band 10 in notch 20'. Once the band 10 is fitted within one or more of the notches 20, 20' as shown in FIG. 6, the retainer 5 may be pulled against the first end 11 of the band 10 to establish a snug fit.

With the sides 13, 14 of band 10 resting in notches 20, 20' in the preferred embodiment, the user may use the elastomeric band 10 and retainer 5 to bundle or otherwise organize one or more objects, as depicted in FIGS. 1 and 2. As shown in FIGS. 1 and 2, the first and second ends 11, 12 of the band 10 are wrapped around the object 15 and the retainer 5, located on the first end 11 of band 10, is then inserted through second end 12 of band 10, typically, in a button hole fashion or by stretching the first end 11 open to receive the length $L_R$ of retainer 5. At this point, the tension on the band 10 pulls the retainer 5 taut against the sides 13, 14 adjacent the second end 12 of band 10 preventing withdrawal of the retainer 5 and consequently, the first end 11 of the band 10 from the second end 12. In this way, the band 10 is held in the secured position around object 15, as shown in FIG. 2. As will be appreciated, the placement of the band 10 in the secured position may be used for attachment to or to organize one or more objects 15.

It should be apparent from the above description and the appended Figures, that the present invention eliminates the use of a separate pin to attach a retainer to an elastomeric band. It will further be appreciated that various modifications may be made to the present invention without departing from the spirit thereof. To appreciate the scope of the invention, reference should be made to the following claims.

What is claimed is:

1. A wrap comprising, an elastomeric band having a uniform width substantially greater than its thickness, a retainer having a body defining a notch for receiving widthwise a portion of said elastomeric band, a band receiving portion of said notch, a first tab extending axially of said retainer over said band receiving portion of said notch and defining a mouth portion of said notch, wherein said mouth portion has a width less than the width of said elastomeric band.

2. The wrap of claim 1, wherein said body has a second tab extending axially toward but spaced from said first tab to define said mouth portion.

3. The wrap of claim 1 further comprising, a second notch located substantially diametrically opposite said first notch.

4. The wrap of claim 3, wherein said first and second notches are symmetrical about an axis of said body of said retainer.

5. The wrap of claim 1 further comprising, a second tab extending from said body portion opposite said first tab, wherein said mouth portion is defined between said first and second tabs.

6. The wrap of claim 5, wherein said first and second tabs extend equidistantly from said body portion to define a substantially T-shaped notch.

7. The wrap of claim 5, further comprising a second notch having a mouth defined by at least one tab that is less than said width of a side of said elastomeric band, whereby one portion of said elastomeric band is received within said first notch and another portion of said elastomeric band is received in said second notch and radially retained by the respective tabs.

8. The wrap of claim 7, wherein said second notch includes a pair of spaced tabs extending from said body portion to define said opening.

9. The wrap of claim 7, wherein said notches are symmetrical about an axially extending centerline of said retainer.

10. A wrap comprising a continuous elastomeric band having a substantially uniform width and having a substantial width to thickness ratio, a retainer having an elongate body including a notch for receiving widthwise a portion of said elastomeric band, a band receiving portion of said notch extending transversely of said elongate body, a first tab extending axially over said band receiving portion of said notch and defining a mouth portion of said notch, said mouth portion having a width less than the width of said elastomeric band.

11. The wrap of claim 10, wherein said body has a second tab extending axially toward but spaced from said first tab to define said mouth portion.

12. The wrap of claim 10 further comprising, a second notch located substantially diametrically opposite said first notch.

13. The wrap of claim 12, wherein said first and second notches are symmetrical about an axis of said body of said retainer.

14. The wrap of claim 10 further comprising, a second tab extending from said body portion opposite said first tab, wherein said mouth portion is defined between said first and second tabs.

15. The wrap of claim 14, wherein said first and second tabs extend equidistantly from said body portion to define a substantially T-shaped notch.

16. The wrap of claim 14, further comprising a second notch having a mouth defined by at least one tab that is less than the width of said elastomeric band, whereby one portion of said elastomeric band is received within said first notch and another portion of said elastomeric band is received in said second notch and radially retained by the respective tabs.

17. The wrap of claim 10, wherein said retainer is substantially cylindrical.

18. The wrap of claim 10, wherein said notch is located substantially medially of said elongate body.

19. A wrap comprising, an elastomeric band of uniform width adapted to be folded over to form a first end loop and a second end loop, an elongate retainer having a body defining a notch for receiving widthwise said first end loop of said elastomeric band, a slot in said retainer located inward thereof, and a mouth portion communicating with said slot and opening externally of the retainer, said mouth portion having a width less than the width of the elastomeric band, wherein said first end loop with said retainer is receivable in said second end loop and held by said retainer to prevent separation of said first end loop and said second end loop.

* * * * *